(12) United States Patent
Ebeling et al.

(10) Patent No.: US 7,414,537 B2
(45) Date of Patent: Aug. 19, 2008

(54) DEVICE FOR THE OPTICAL REPRESENTATION OF INFORMATION ON THE ACTUAL OPERATING STATE OF A LIQUID SYSTEM, AND USE OF SAME

(75) Inventors: Ruediger Ebeling, Hamburg (DE); Michael Glueck, Quickborn (DE)

(73) Assignee: AOA Luftfahrtgeraete Gauting GmbH, Gauting (DE)

( * ) Notice: Subject to any disclaimer, the term of this patent is extended or adjusted under 35 U.S.C. 154(b) by 792 days.

(21) Appl. No.: 10/714,406

(22) Filed: Nov. 17, 2003

(65) Prior Publication Data

US 2004/0145534 A1    Jul. 29, 2004

(30) Foreign Application Priority Data

Nov. 15, 2002    (DE) ................................. 102 53 368

(51) Int. Cl.
 *G08B 21/00* (2006.01)
(52) U.S. Cl. .................... 340/612; 340/815.4
(58) Field of Classification Search ................ 340/612, 340/618, 603, 655, 691.6, 693.9, 815.4, 693.6, 340/815.5
See application file for complete search history.

(56) References Cited

U.S. PATENT DOCUMENTS 5,533,648 A *  7/1996 Read et al. ................. 222/108

5,705,747 A *  1/1998 Bailey ........................ 73/290 R
6,014,075 A *  1/2000 Fujimori et al. ............. 340/461
2003/0219062 A1* 11/2003 Egidio ........................ 374/170

FOREIGN PATENT DOCUMENTS

| DE | 198 05 133 A1 | 8/1999 |
|---|---|---|
| DE | 198 42 286 C1 | 11/1999 |
| DE | 198 39 000 A1 | 3/2000 |
| DE | 199 19 155 A1 | 11/2000 |
| DE | 198 35 920 C2 | 8/2001 |
| DE | 696 21 374 T2 | 9/2002 |

* cited by examiner

*Primary Examiner*—Phung Nguyen
(74) *Attorney, Agent, or Firm*—Rothwell, Figg, Ernst & Manbeck, PC

(57) ABSTRACT

The invention relates to a device for the optical display of information regarding the actual operating state of a liquid system and/or for setting parameters for a set operating state of the liquid system, comprising a housing (12) arranged in the area of the operation of the liquid system, a display unit (14), accommodated by the housing (12), for optical display of the information in electronic form, and actuating device (16), accommodated by the housing (12), for setting at least one parameter and a, in particular electronic, control unit (18; 44) for processing and/or conditioning of data and/or signals referring to the actual or set operating state of the liquid system, and their use.

27 Claims, 3 Drawing Sheets

DEVICE FOR THE OPTICAL REPRESENTATION OF INFORMATION ON THE ACTUAL OPERATING STATE OF A LIQUID SYSTEM, AND USE OF SAME

BACKGROUND OF INVENTION

1. Field of the Invention

The invention relates to a device for the optical representation of information on the actual operating state of a liquid system and/or for setting at least one parameter for a set operating state of the liquid system, and use of same.

2. Description of Related Art

Devices of this kind are generally known. According to prior art, the liquid content of tanks is usually shown by sight glasses mounted directly on the tank. Such sight glasses are, however, not suitable for determining the exact liquid content, but can usually only be regarded as an approximate measure of the actual amount of liquid. Furthermore according to prior art, on aircraft devices are known for indicating the amount of water, that are fitted with a pointer corresponding to FIG. 4, or two pointers corresponding to FIG. 5. Such water amount indicators have, however, been shown to have disadvantages due to their design. On one hand, all these water amount indicators are based on measuring instruments that operate on the analog principle, which necessarily leads to inaccuracies in the reproduction of the actual amount of liquid in the tank. A not insignificant result of this is that the reading of the actual liquid content of the tank by operating personnel is comparatively expensive and not particularly reliable, because of the inaccurate scaling of such water amount indicating devices. Furthermore, it also not possible with these water amount indicating devices to set parameters for a set operating state of the liquid system.

BRIEF SUMMARY OF THE INVENTION

The object of this invention is therefore to provide a device for the optical display of information on the actual operating state of a liquid system and/or for setting at least one parameter for a set operating state of the liquid system, which prevents the above disadvantages while at the same time being of particularly simple design, compact and stable, and also enabling a simple, precise and reliable reading of the actual operating state of a liquid system and an individual adjustment of at least one parameter for a set operating state of the liquid system, as well as its application.

This object is achieved in a surprisingly simple manner by a technical device with the features of original claim 1.

Due to the design of the device in accordance with the invention, comprising a housing arranged in the area of the operation of the liquid system, a display unit mounted in the housing for visual display of information in electronic form, an actuating device for setting at least one parameter and a, particularly electronic, control unit for processing and/or conditioning the data and/or signals reflecting the actual or set operating state, a particularly simple device that is also itself of compact construction is achieved. Furthermore, this device in accordance with the invention enables the actual operating state of the liquid system to be easily, precisely and very reliably read. Finally, in this manner the setting of at least one parameter for a set operating state of the liquid system is ensured, and this can be carried out in the area or location of the operation of the liquid system.

Further advantageous details of the device in accordance with the invention are described in original claims 2 to 24.

Of particularly great significance for a simple reading and also ease of handling of the device in accordance with the invention is the housing in accordance with original claim 2 mounted in the outer area of the liquid system.

In this case, the housing in accordance with the features of original claim 3 can preferably be mounted on a wall, or similar, enclosing the liquid system, particularly in a recess in the wall.

In this connection, it has been shown to be distinctly advantageous if the housing can be mounted on the wall or in a recess in the wall, flush or at least partly recessed, so that it projects only slightly relative to the area spanned by the wall. In this way, the device is protected against the effects of weather and presents no resistance if the device is used in a moving liquid system.

Preferably, the housing in accordance with original claim 5 is secured to the wall or in a recess in the wall using captive screws.

Furthermore, the invention includes that the housing corresponding to the features of original claim 6 can be formed in two sections with essentially one flat lower section and one partly cover-shaped upper section being provided, that are secured to each other by screws.

Appropriately, the screws for securing the essentially flat lower section and partly cover-shaped upper section are in this connection, in accordance with original claim 7, not accessible from the outside of the housing. This ensures that the lower section and upper section of the housing cannot be lifted from each other and parted without the complete housing being detached from the wall or the recess in the wall. Manipulation by operating personnel is thus prevented.

Furthermore, the invention provides that the housing corresponding to the features of original claim 8 be encapsulated, particularly temperature insulated.

Of particularly interest for many possible applications of the device in accordance with the invention are the measures of original claim 9. According to these, a heater for heating the inner space around the housing and/or a cooling device for cooling the internal space surrounded by the housing and for maintaining a constant temperature level therein is allocated to the housing. By the intentional raising or lowering of the temperature and subsequent maintenance of the achieved temperature level in the housing, a (continuous) operation of the device overall is guaranteed, even in the event of the device in accordance with the invention being subjected to very low or very high outside temperatures and therefore not least great temperature fluctuations.

Of particular advantage for a particularly versatile possible use and application of the device in accordance with the invention are also the measures of original claim 10, that the display unit is of electroluminescence or similar design, particularly a ¼" VGA display that has 320×240 pixels, or is a similar display. In this way, it is possible to display a number of fonts, letters, numbers, icons, graphic elements or other pictures, with a limited differentiation, by means of the display unit, and at the same time also possible to substantially improve the display of information with regard to accuracy and weighting. This finally also makes the performance of operating procedures by operating personnel in the area or location of the liquid system substantially more simple, with the result that operating inaccuracies or even operating errors can be largely avoided.

In this connection, the features of original claims 12 to 17 serve to provide a distinctly simple, complete and extraordinarily accurate supply of necessary information to operating personnel. In this context, the facility of enabling the information to be displayed to be weighted is of very substantial significance. Operating personnel can thus also be provided with additional information, such as the consequences of non-compliance with appropriate instructions etc.

In particular, it is provided in accordance with the invention that the actuating device in accordance with original claim 18 has at least one control element for selecting at least one parameter. The at least one parameter can in this case be selected by the control element using what's known as "pin programming" or similar and then activated by double clicking etc.

In a further simplification of the operation of the device in accordance with the invention, the actuating device has, in accordance with original claim 19, at least two other control elements acting in an opposite direction to each other for setting the at least one, already selected, parameter. One of the two control elements in this case is provided with a "plus" presetting or preselection and the other control element is designed to operate in the opposite direction by means of a "iminus" presetting or preselection.

In a preferred manner, the control unit is arranged in the housing accordance with the features of original claim 20. As an alternative, it is also conceivable that the control unit be fitted in a different housing separate from this. Whether the control unit is integrated into the housing device completely or is fitted in a housing separate from it depends essentially on the particular space conditions in which the device in accordance with the invention is to be fitted in the outside area of the liquid system.

In accordance with original claim 21, it is advantageously provided that the control is designed in such a way that it interacts with the display unit, the actuating device, the heater and the liquid system. In this way, a design that is compact and therefore small to build is achieved overall.

Of quite special significance for a simple construction of the complete device that is also compact and reliable are the measures of original claims 22 and 23. According to these, the control unit directly includes the heater allocated to the housing and/or the control unit also contains a further internal heater that is directly allocated to the components of the control unit.

Furthermore, the scope of the invention also provides that the control unit in accordance with original claim 24 communicates with the liquid system by means of a data bus and, preferably, by means of a Controller Area Network (CAN) bus or a RS485 bus.

Finally, the invention also includes that the device in accordance with original claims 25 to 27 is used in a stationary liquid system of a building, a building structure or similar or in a mobile liquid system of a land vehicle and/or aircraft and/or watercraft. The use of the device in accordance with the invention in a liquid system of an aircraft has been shown to be particularly advantageous, with the device being in particular mounted on the underside of the fuselage. Finally, the device in accordance with the invention is advantageously suitable for the visual display and setting of the actual and set operating states of a drinking and/or service water system, fuel system, particularly kerosene systems, sterilizing system, drainage systems and wastewater systems.

BRIEF DESCRIPTION OF THE DRAWINGS

Further features, advantages and details of the invention are given in the following description of a preferred form of the embodiment of the invention, with the aid of drawings. These are as follows.

DETAILED DESCRIPTION OF THE INVENTION

Figure 1:
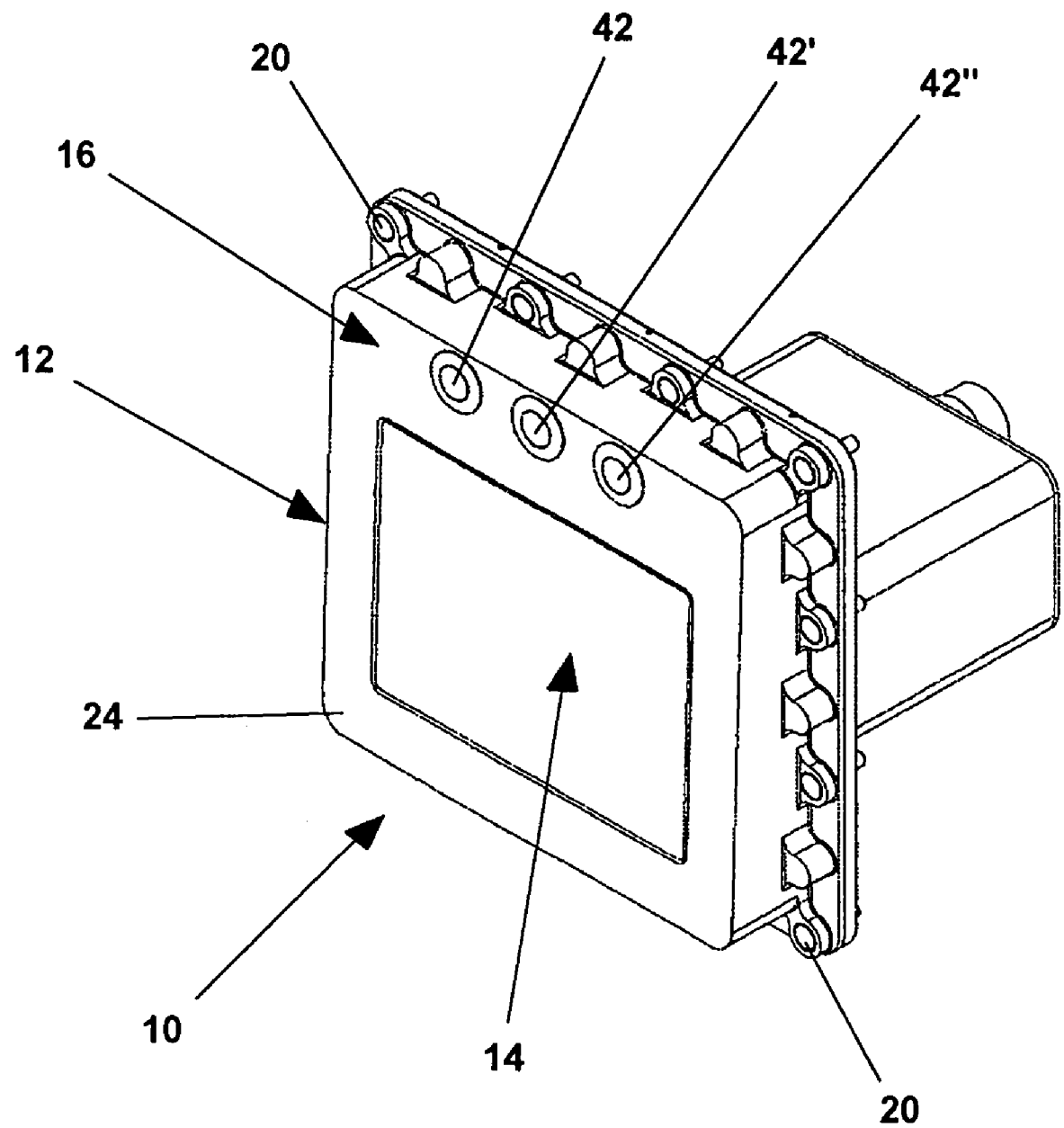
FIG. 1 A perspective front view of an embodiment of the device in accordance with the invention FIG. 2 An exploded perspective view of an embodiment of the device in accordance with the invention corresponding to FIG. 1

In the following description of a form of embodiment of a device in accordance with the invention 10 for the visual display of information by means of an actual operating state of a liquid system (not illustrated) and/or for setting at least one parameter for a set operating state of the liquid system, identical reference characters are used in each case for components that are the same.

The device 10 in accordance with the invention can be advantageously used in a stationary liquid system of a building, building structure or similar. Equally, the device 10 in accordance with the invention is suitable for use in a mobile liquid system of a land vehicle and/or aircraft and/or watercraft. In this connection, it has been shown to be particularly advantageous if the device 10 in accordance with the invention is used in a liquid system of an aircraft with the device 10 in accordance with the invention being mounted particularly on the underside of the fuselage of the aircraft. In practice, the device 10 in accordance with the invention has been shown to be particularly advantageous when used for the visual display and adjustment of the actual or set operating states of drinking and/or service water systems, fuel systems, particularly kerosene systems, disinfectant systems, drainage system and wastewater systems.

Figure 2:
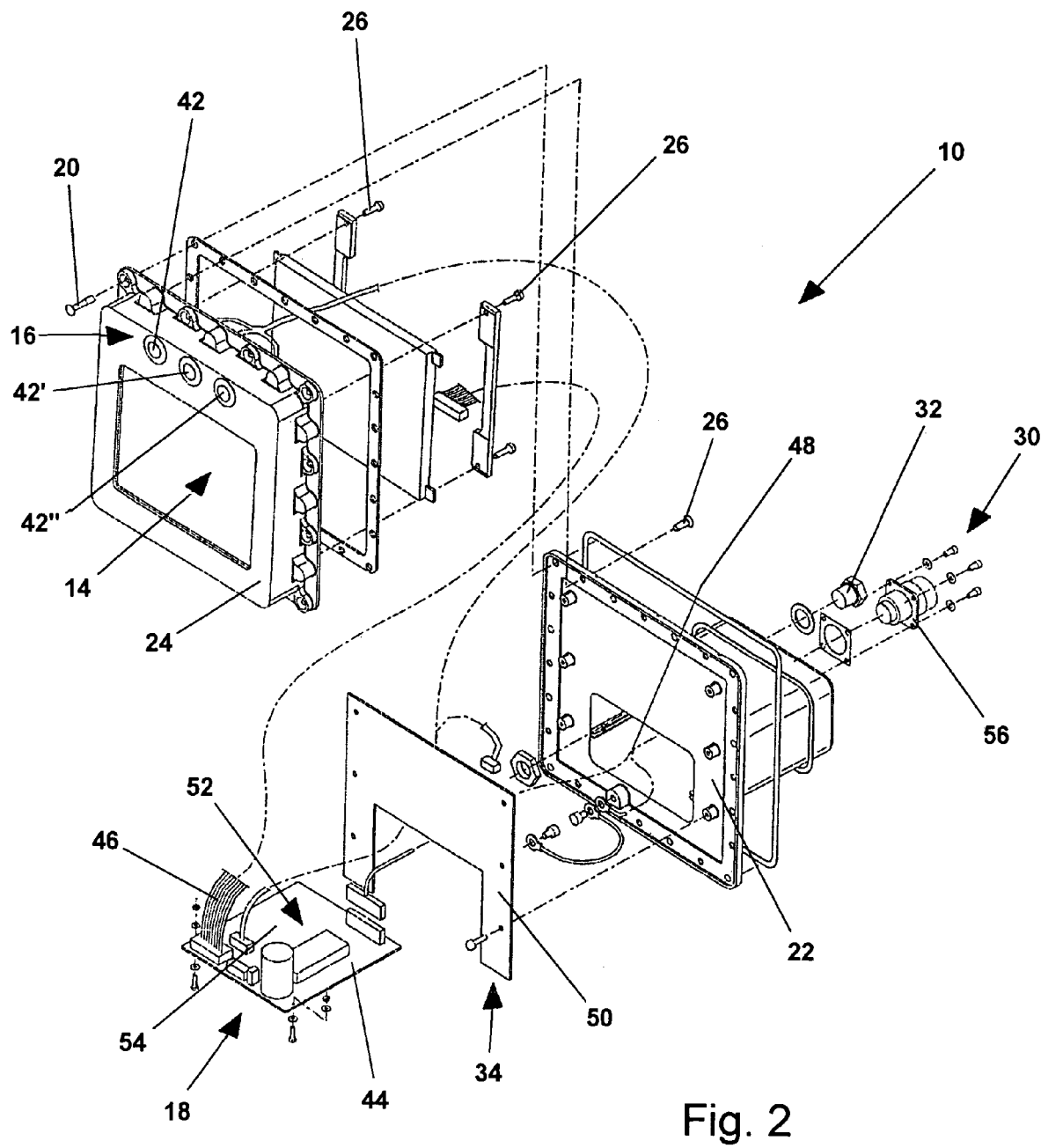

The device 10 in accordance with the invention, shown in FIGS. 1 and 2, has a housing 12 that is preferably arranged in the area, or at the location, of the operation of the liquid system. The terms "in the area or at the location of operation" generally mean the service area for the liquid system. In this case it can, for example, be an area or location of a vehicle or aircraft adjacent to a tank nozzle.

Furthermore, the device 10 in accordance with the invention has a display unit 14 contained in the housing 12. The display unit 14 serves for the visual display of information in electronic form, very generally the display of graphics.

Furthermore, the device 10 in accordance with the invention is fitted with an actuating device 16 that is also contained in the housing 12. The actuating device 16 is provided for the adjustment of at least one parameter, as described in detail in the following.

Finally, the device 10 in accordance with the invention has a, particularly electronic, control unit 18. The control unit 18 processes or conditions data and/or signals, received and to be forwarded, that refer to the actual and/or set operating state of the liquid system.

Without being shown in detail, the housing 12 is arranged in the outside area of the liquid system. For this purpose the housing 12 can be mounted on a wall or similar enclosing the liquid system, or in a recess in the wall so that it is slightly projecting, flush or at least partly recessed relative to the area spanned by the wall. In general, the housing 12 should be secured to the wall or recessed into a recess in the wall or partly recessed, to avoid the device 10 being exposed in particular to external weather influences when used in a stationary liquid system and when used in a moving liquid system to avoid it representing any additional, even greater (air) resistance.

The housing 12 can be secured in accordance with FIGS. 1 and 2 to the wall or a recess in the wall by using captive screws 20. These can be standard screws that have been rendered captive by mechanical reworking. For example an automatic loosening can be prevented by the retrospective fitting of a locking washer by a particular design of the thread to prevent a rotary movement of the screws against the screw-in direction etc.

As shown in FIGS. 1 and 2, the housing 12 is designed in two sections. The housing 12 accordingly consists in its basic construction of an essentially flat lower section 22 and a partly cover-shaped upper section 24. The lower section 22 and upper section 24 of the housing 12 are joined together by screws 26.

The screws 26 for joining the essentially flat lower section 22 and the partly cover-shaped upper section 24 in this case extend from the lower section 22, that is facing towards the wall or recess in the wall of the liquid system, into the upper section 24. The screws 26 are consequently not accessible from the outside 28 of the housing 12. Therefore, it is not possible to remove or separate the upper section 24 of the housing 12 from the lower section 22 without first removing the complete housing 12 from the wall or from the recess in the wall of the liquid system.

Furthermore, the housing 12 is encapsulated, under certain circumstances it is even of pressure proof design. To this extent, the housing 12 when used in aviation forms a pressure-proof closure of the inside of the aircraft relative to the outside. For equalization of pressure and/or moisture between the housing 12 and the inner space of the aircraft, a balancing device 30 with a breather membrane 32 can, for example, be provided on the inside of the aircraft. The housing 12 is characterized by a small overall height. Due to this, a small wall recess is sufficient for installation so that the housing 12 can be mounted recessed, flush with the wall or only slightly projecting.

The housing 12, sealed against the outside, can under certain circumstances even be of pressure-proof design and can furthermore be temperature insulated (not shown in detail). To this extent, the housing 12 can equally be used for operation at very low temperatures, for example at outside temperatures of −55° C. and more, and equally also at very high temperatures, for example at outside temperatures of 40 to 50° C. and above.

To guarantee continuous operation of the device 10 in accordance with the invention at extreme temperatures of this kind, the housing 12 can additionally be provided with a heater 34 to heat the space surrounding the housing 12 and also to maintain a constant temperature level within. A heater 34 of this kind can be allocated directly to the housing 12, or only indirectly, i.e. for example to other components accommodated by the housing 12. Various examples of embodiments of a heater 34 of this kind are explained in more detail in the following in conjunction with the control unit 18.

It is equally possible, where the use of the device 10 in accordance with the invention makes it necessary, to provide a cooling device, as an alternative or addition to the heater 34, to cool the internal space enclosed by the housing 12 and then to maintain a constant temperature level therein (also not shown in detail).

The display unit 14 of the device 10 in accordance with the invention, shown schematically in FIGS. 1 and 2, is of electroluminescence or similar design, i.e. it uses the electroluminescence or a similar technique. The display unit 14 is appropriately provided with a ¼" VGA display with 320×240 pixels, as is in common use in industry, or a comparable display with similar characteristics.

The display unit 14 of the device 10 in accordance with the invention is preferably of graphics-capable design, with the application possibilities of the device 10 in accordance with the invention thus being substantially improved. In this case with the device 10 that has a graphics-capable display unit 14, fonts, letters, numbers, icons and similar picture elements or other images of non-Latin origin can be displayed. For example, it is possible without difficulty to display fonts, letters, numbers, icons or similar picture elements and other pictures in the Arabic, Chinese or Japanese language on the display unit 14 of the device 10. Together with this, an incorrect or faulty operation by operating personnel can be avoided by a very simple method that is at the same time effective and reliable.

The information to be displayed by the display unit 14 can in this case, for example, be electrically detected, as explained in more detail in the following.

In order to offer operating personnel as much information as possible, the display unit 14 of the device 10 in accordance with the invention is divided into at least two display fields 36, 36', 36", 36'". In the individual display fields 36, 36', 36", 36'", the information to be displayed can additionally be individually shown by enlargement, flashing at intervals or positive/negative representation of the fonts, letters, numbers, icons or similar picture elements as well as pictures corresponding to the actual information content. Depending on the importance, the information selected in this way can be shown as eye catchers compared with other information and thus be graphically highlighted.

Figure 3:
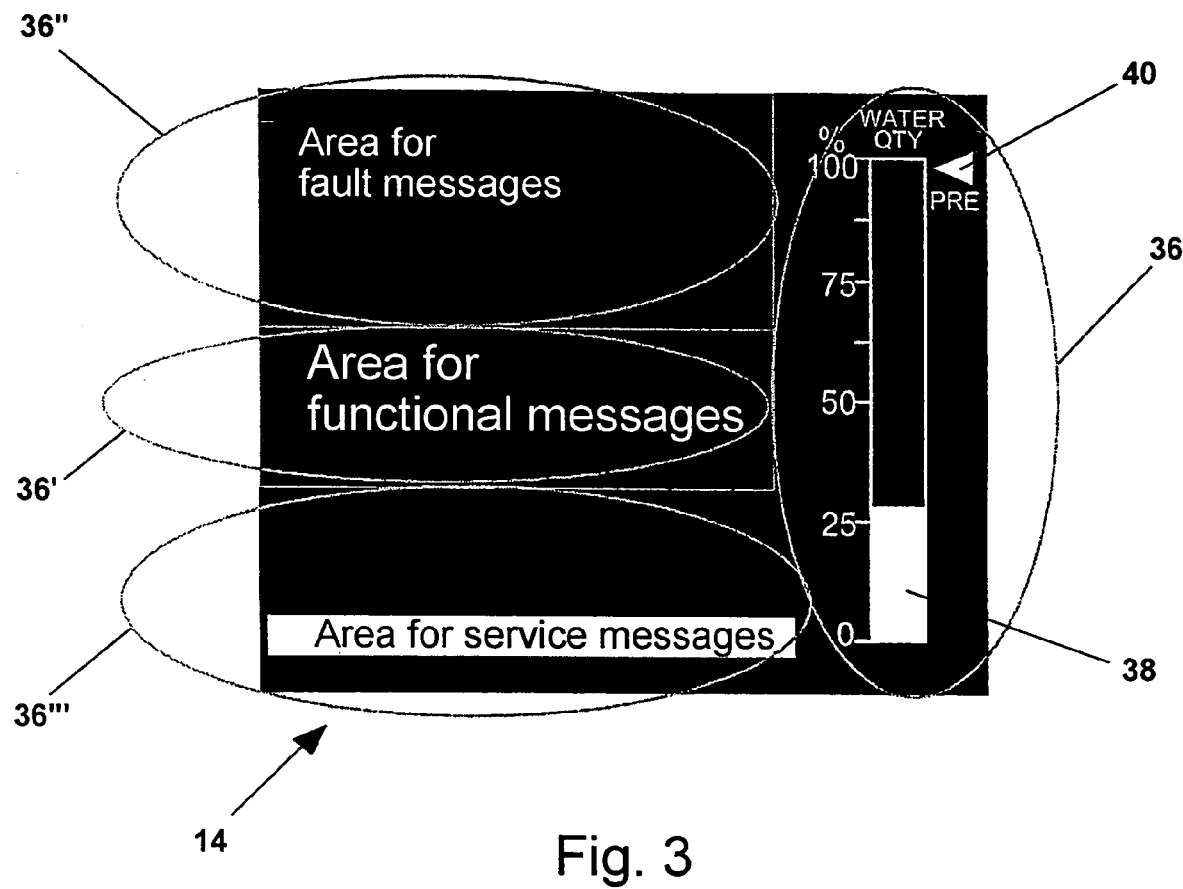
FIG. 3 A front view of an embodiment of a display unit in accordance with the invention, with four display fields FIG. 4 A conventional analog water amount indicating device with a pointer, of the kind at present used in aircraft FIG. 5 A further conventional analog water amount indicating device with two pointers, of the kind at present used in aircraft.
Figure 4:
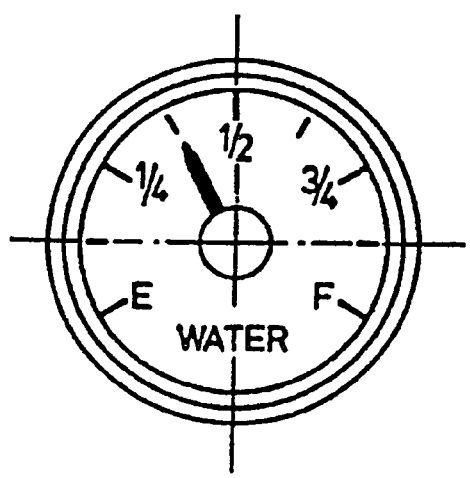
Figure 5:
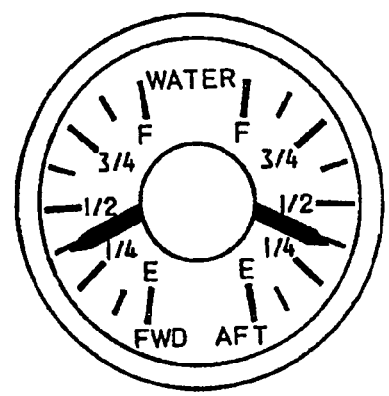

As can be clearly seen from FIG. 3, the embodiment of the display unit 14 of the device 10 is divided into a total of four display fields 36, 36', 36", 36'". The actual operating state and the set operating state, functional information, fault information and other service information can be displayed in these four fields 36, 36', 36", 36'".

Display field 36 shows the actual operating state in the form of the current amount of liquid present in the liquid system, i.e. the current amount of liquid in the pipe and tanks of the liquid system or of the current contents level. At the same time, the set operating state in the form of the required amount of liquid to be provided in the liquid system, or of the required contents level to be given, is displayed in display field 36. In principle, the display unit 14 can show the actual and/or set operating state of the liquid system as columns, bars, arrows, numerical values or similar.

In the example of an embodiment of the display unit 14 shown, the current amount of liquid in the tanks is shown as a height-variable column 38, with the maximum replenishment amount of liquid being given in percentages on the left side of the height-variable column 38. The required contents level to be reached when refilling or draining the tanks is shown by a moving arrow 40 to the right of the height-variable column 38. In practice it has been shown to be particularly advantageous to show the actual operating state on the display unit 14 in step of 1%, the set operating state by the moving arrow 40 in predetermined steps, for example 12.5, 25, 37.5, 50, 62.5, 75, 87.5 and 100%.

As an alternative, it is also possible to provide a different visualization and representation of the actual and/or set operating state instead of the height-variable column 38 and the moving arrow 40 allocated to the column 38. For example, both the actual operating state and the set operating state of the liquid system can be shown by separate columns. It is also possible to show the absolute numerical value in percentages.

As shown in FIG. 3, functional information or messages important for operating personnel of the liquid system are shown in display field 36' of the display unit 14. The font used in this case is kept larger than all the other fonts because functional information must particularly be observed by operating personnel. Operating states of the liquid system, such as "Drainage in progress" or "Training in progress" can be given as information, that is at the same time linked to quite specific action instructions for operating personnel.

In the form of embodiment of the display unit 14 shown in FIG. 3, fault information or fault messages important for operating personnel are shown in display field 36", in order for associated further instructions regarding behavior or actions to be derived from them. The font used is smaller than the font in display field 36' for functional information or messages, because in this case they are only additional notes.

Finally, further service information or service messages important for operating personnel are given in display field 36''' of the display unit 14 schematically shown in FIG. 3. In addition, it is also possible to show service information or service messages in a flashing mode in display field 36'''.

As shown in FIG. 3, the background of the display unit 14 is kept black, whereas all the information to be displayed is shown in a white script. It is therefore what's called a negative arrangement.

Furthermore, it is also completely conceivable for the information to be displayed on the display unit 14 to be shown inverted flashing, i.e. for example to change to a black script on a white background, and vice versa.

In the form of the embodiment of the display unit 14 shown in FIG. 3, English is, for example, the language chosen in display field 36 and German is the language used in display fields 36', 36" and 36'''. This means it is possible to select a different language for the different display fields 36, 36', 36", 36'''. It is, however, equally possible for the specialist to provide a single language for all the provided display fields 36, 36', 36", 36''' of the display unit 14. In a similar manner, it is also conceivable to select a different, non-Latin language such as Arabic, Chinese or Japanese instead of English and/or German. The selection can be easily made by the particular competent operating personnel, as described in the following. The display unit 14 is thus able to present the information to be displayed in an individually activatable language.

The actuating device 16 of the device 10 in accordance with the invention comprises at least one control element 42, 42', 42" for selecting the at least one parameter. The at least one control element 42, 42', 42" is, for example, designed as a pushbutton or pushkey and is formed in or on the upper section 24 of the housing 12. The at least one control element 42, 42', 42" is on one hand the input point or operating knob for operating the device 10 and for thus adjusting the display unit 14, and one the other hand for programming the control unit 18. The number of control elements can vary as required and is usually in any case determined by the size and design of the housing 12.

On the form of embodiment of the device 10 in accordance with the invention shown in FIGS. 1 and 2, at total of three control elements 42, 42', 42" are provided.

By means of the control element 42, for example, parameters to be used for the current situation such as the language in display unit 14 of the font, letters, numbers, icons or graphic elements or pictures of individual actions to be performed, i.e. replenishing, draining of drinking water, service water or kerosene, emptying or draining waste water, disinfecting etc. can be set or programmed. The control element 42 is, for example, provided with "pin programming".

The other two control elements 42' and 42" can, for example, act in opposite directions to each other, to enable at least one parameter to be set. In this connection, for example the control element 42' can be provided with a "plus" presetting or preselection and control element 42" with a "minus" presetting or preselection. The set operating state can thus be precisely determined, for example increased by actuating control element 42', which in the example of embodiment of the display unit 14 shown in FIG. 3 causes the arrow 40 to move upwards. Vice versa, the set operating state can be reduced by actuating control element 42", in the case of the form of embodiment of the display unit 14 shown in FIG. 3 causes arrow 40 to move downwards. By appropriate actuation of control elements 42' or 42", the previously specified values can thus be obtained for the required set operating state of the liquid system, for example by stages in steps of 12.5, 25, 37.5, 50, 62.5, 75, 87.5 and 100%.

The relevant service procedures can thus in this manner be initiated as close as possible in the area or at the location of the operation, i.e. in the service area or service location or at the tank nozzles of the liquid system, for example the drainage or disinfecting of liquid systems can be triggered by pressing the corresponding drainage or disinfecting control element or, if only one control element is operative, by pressing that several times until the relevant service procedures appear on the display unit 14 and then, for example, by double clicking.

Furthermore, particularly as shown in FIG. 2, the control unit 18 can be fitted integrally into the housing 12. Without being shown in detail, it is, however, equally possible to fit the control unit 18 in a different housing (not illustrated) separate from the housing 12. To that extent, it is completely conceivable to structurally provide two separate housings instead of housing 12, one housing that essentially takes the display unit 14 with or without the actuating device 16 and one housing that essentially takes the control unit 18 with or without the actuating device 16. Both housings could then under certain circumstances be spatially separated from each other in the area or location of the operation of the liquid system, particularly in the outside area of a vehicle or aircraft, and then preferably underneath its fuselage, at or from which the corresponding water and fuel systems of the aircraft are accessible.

The control unit 18 is designed in such a way that it interacts totally with the display unit 14, the actuating device 16, the heater 34 and the liquid system.

For this purpose, the control unit 18 of the device 10 in accordance with the invention shown in FIG. 2 has an interface element, interface circuit board or interface card 44. Arranged on the interface element 44 is a microcontroller and the peripherals necessary for it, such as for example a RAM memory, a ROM memory, external interfaces and other electronic components (also not shown individually). The control unit 18 receives data and/or signals via the interface element 44, mainly from the display unit 14 and the actuating device 16 and also from the complete liquid system.

The control unit 18 in this case is on one hand electrically connected to the display unit 14 and/or the actuating device 16 by an internal cable assembly 46 and on the other hand to the complete liquid system, or to the environment containing the liquid system, such as for example the aircraft, by means a connector 48 or similar.

After receiving data and/or signals from the actuating device 16 and/or liquid system or a control assembly connected to it and after processing or conditioning the received data and/or signals, the control unit 18 forwards the relevant data and/or signals and information to the display unit 14 and/or the liquid system or the control assembly connected to it. The display unit 14 then converts the received data and/or signals as necessary and presents the corresponding information on its provided display. In this way, communication with other electronic components and/or equipment, including of the liquid system in general, is present by means of electronic data transfer.

As mentioned above, the housing 12 can have a heater 34 to heat the internal space enclosed by the housing 12. For the form of embodiment of the device 10 in accordance with the invention as shown in FIGS. 1 and 2, the heater 34 is integrated into the control unit 18 in the form of a heating element, heating circuit board or heating card 50. The heating element 50 that contains a suitably provided sensor, such as a temperature sensor and an electronic monitoring unit tuned to it, for example a safety switch, serves to heat the internal space of the unit 12 and then to hold it at a uniform temperature level.

Furthermore, control unit 18 has a further internal heater 52 that is allocated directly to the components of the control unit 18. The heater 52 in this case is arranged within the interface element 44 as a separate heating component or heating layer 54. The components required for operation of the heating layer 54 and the safety circuits for temperature monitoring are integrated into the interface element 44. This enables the use of particularly cost-effective electronic components for the control unit 18 with at the same time an overall expansion of the operating temperature range of the device 10 in accordance with the invention.

Due to the heater 34 with the heating element 50 and/or internal heater 52 in the form of a heating layer 54, used with the form of the device 10 in accordance with the invention as shown in FIGS. 1 and 2, it is ensured in a quite outstanding manner that the internal temperature in the internal space of the housing 12 can not drop below −40° C. and it is also guaranteed that the device 10 in accordance with the invention can even withstand (continuous) operation at an outside temperature of −55° C. and more.

Finally, the control unit 18 communicates via data bus 56. The data bus 56 can be a controller area network (CAN) bus, for example a CAN 2.0B data bus, or be based on a comparable data bus with similar properties such as a RS485 bus, in order to communicate with other equipment assigned to the liquid system. In this way, the device 10 receives all the necessary status information on the state of the system as data bus messages that are first sent to the control unit 18, that then carries out a processing or conditioning of the received data and/or signals and passes these on to the display unit 14. The display unit 14 then displays the data in almost real time.

The device in accordance with the invention is not limited to the presented form of embodiment of the device 10. It is thus possible without difficulty to dispense with the heater 34 in the form of the heating element 50 and/or the internal heater 52 or heating layer 54, by using suitable alternative selected electronic components that already enable (continuous) operation at high temperature fluctuations. Equally, one or both of the heaters 50 or 52, 54 can be dispensed with if the device 10 in accordance with the invention is exposed to less extreme environmental conditions. The same applies in a corresponding manner to the structural design of the device in accordance with the invention with a cooling device, provided either as an alternative or in addition to the heater 50 or 52, 54, for cooling the internal space enclosed by the housing 12 and for maintaining a constant temperature level there.

The invention claimed is:

1. A device for the optical display of information representing an actual operating state of a liquid system and/or for setting a parameter for a set operating state of the liquid system, said device comprising:
    a housing arranged in the area of the operation of the liquid system,
    a display unit having a graphics resolution of at least 320× 240 pixels accommodated in the housing for optical display of information in electronic form,
    an actuating device accommodated by the housing for setting at least one parameter, a control unit for processing data and/or signals referring to the actual or set operating state of the liquid system, and
    a data bus for communications between the control unit and the liquid system wherein the data bus is compatible with Controller Area Network (CAN) or RS485;
    wherein information to be displayed can be individually represented by enlargement, flashing at intervals or positive/negative arrangement of the font, pictures or icons corresponding to the particular information content.

2. The device in accordance with claim 1, wherein the housing is arranged in the outside area of the liquid system.

3. The device in accordance with claim 1, wherein the housing can be mounted on a wall enclosing the liquid system, particularly in a recess in the wall.

4. The device in accordance with claim 3, wherein the housing can be mounted on the wall, or in the recess of wall, slightly projecting, flush or at least partially recessed relative to the area spanned by the wall.

5. The device in accordance with claim 3, further comprising captive screws for mounting the housing on the wall or in a recess in the wall.

6. The device in accordance with claim 1, wherein the housing is of two-part construction comprising a mainly flat lower section and a partly cover-shaped upper section that are joined to each other by screws.

7. The device in accordance with claim 6, wherein the screws for connecting the essentially flat lower section and partly cover-shaped upper section cannot be accessed from the outside of the housing.

8. The device in accordance with claim 1, wherein the housing is of encapsulated design which is temperature insulated.

9. The device in accordance with claim 1, wherein the housing is allocated a heater for heating the inner space enclosed by the housing and/or a cooling device for cooling the inner space enclosed by the housing and for maintaining a constant temperature level therein.

10. The device in accordance with claim 1, wherein the display unit is of electroluminescent design having a VGA display with 320×240 pixels display.

11. The device in accordance with claim 10, wherein the display unit shows the actual and/or set operating state of the liquid system in the form of a column, bar, arrow or as a numerical value.

12. The device in accordance with claim 11, wherein the display unit shows the actual operating state by means of a variable-height column or a variable-length bar in steps of a pre-determined percentage and the set operating state by a movable graphic indicator next to the column or under or above the bar, said movable graphic indicator movable in predetermined steps.

13. The device in accordance with claim 1, wherein the display unit is divided into at least two display fields.

14. The device in accordance with claim 13, wherein the display unit is divided into four display fields, in which the actual operating state and the set operating state, functional information, fault information and other service information can be displayed.

15. The device in accordance with claim 14, wherein the display unit shows the current amount of liquid present in the liquid system or the current contents level as the actual operating state and the required amount of liquid to be provided in the liquid system or the required contents level as the set operating state.

16. The device in accordance with claim 1, wherein the display unit shows the information to be displayed in a language that can be individually activated.

17. The device in accordance with claim 1, wherein the actuating device has at least one control element for selecting the at least one parameter.

18. The device in accordance with claim 1, wherein the actuating device comprises at least two control elements acting in opposing directions, for setting the at least one parameter.

19. The device in accordance with claim 1, wherein the control unit is mounted in the housing or in a different housing separate from it.

20. The device in accordance with claim 1, wherein the control unit is designed in such a way that it interacts with the display unit, the actuating device, the heater and the liquid system.

21. The device in accordance with claim 1, wherein the control unit includes the heater allocated to the housing.

22. The device in accordance with claim 1, wherein the control unit includes a further heater that is directly allocated to the components of the control unit.

23. The device in accordance with claim 1, wherein the device implements an optical display of information representing an actual operating state of the liquid system and/or setting a parameter for a set operating state of the liquid system in a stationary liquid system of a building or building structure or in a mobile liquid system of a land vehicle or aircraft and/or watercraft.

24. The device in accordance with claim 23 in a liquid system of an aircraft wherein the device is mounted on the underneath of the aircraft fuselage.

25. The device of claim 24 wherein the housing is pressure proof.

26. The device of claim 25 wherein the device further comprises a breather membrane.

27. The device in accordance with claim 1 wherein the device implements optical representation and setting of the actual or set operating state in a drinking water system, service water system, fuel systems, disinfecting agent system, drainage system, or wastewater system.

* * * * *